C. GERBEN.
AUTOMOBILE LOCK.
APPLICATION FILED JAN. 27, 1922.

1,433,269.

Patented Oct. 24, 1922.
2 SHEETS—SHEET 1.

INVENTOR
Charles Gerben
BY Wm Wallace White
ATTORNEY

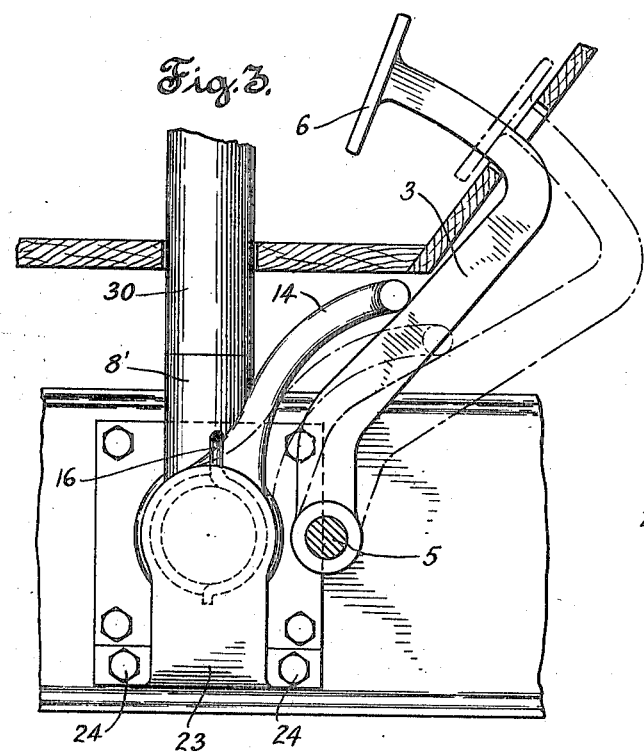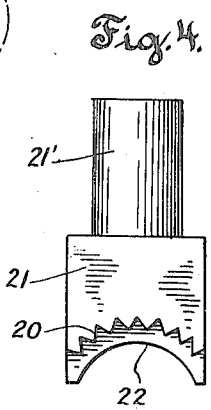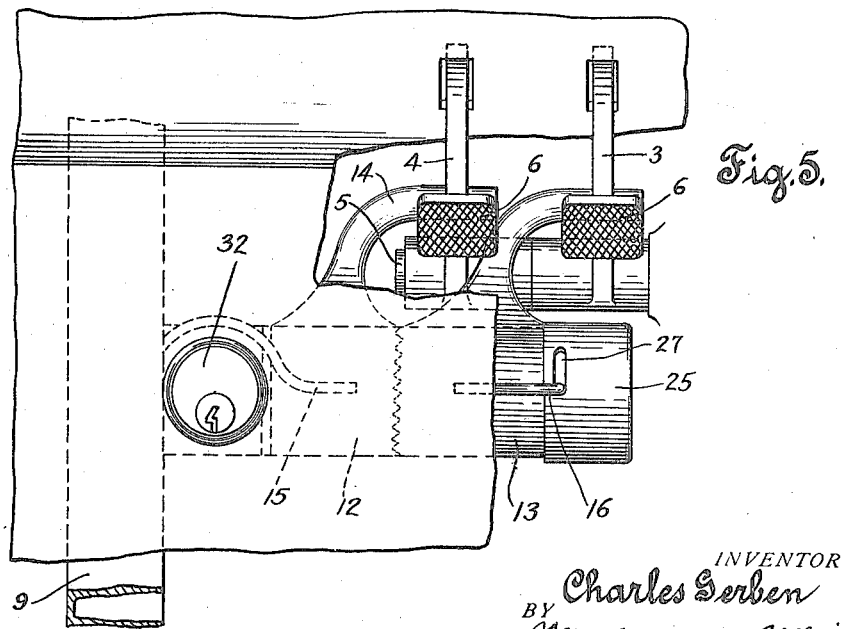

Patented Oct. 24, 1922.

1,433,269

UNITED STATES PATENT OFFICE.

CHARLES GERBEN, OF NEW YORK, N. Y.

AUTOMOBILE LOCK.

Application filed January 27, 1922. Serial No. 532,225.

*To all whom it may concern:*

Be it known that I, CHARLES GERBEN, a citizen of the United States of America, residing at 2321 Beaumont Avenue, Bronx, New York, N. Y., have invented new and useful Improvements in Automobile Locks, of which the following is a specification.

This invention relates to devices for locking motor driven vehicles, an object of the invention being to provide a device which will securely lock the foot pedals of an automobile in the extreme depressed position, so that the clutch will be disengaged and the brakes will be engaged, whereby not only will it be impossible to throw the clutch into engagement with the mechanism for driving the car under its own power, but it will be impossible to move the car by towing, by reason of the fact that the brake is locked in set position.

With the foregoing and other objects in view, which will appear as the description proceeds, the invention consists in the novel features of construction and combination of parts which will be more fully described hereinafter and particularly pointed out in the claims.

In the drawings accompanying and forming part of this specification

Fig. 3 is an end view illustrating the device in position similar to Figs. 1 and 2 and illustrating in dotted lines the depressed position of the clutch and brake levers and the locking levers in operative position;

Fig. 4 is a side view on an enlarged scale, of one of the locking members of the device; and Fig. 5 is a plan view of the device in position and illustrating the lock placed in the floor of the car instead of on the instrument board.

The same characters of reference designate the same parts in the different figures of the drawings.

Figure 1:
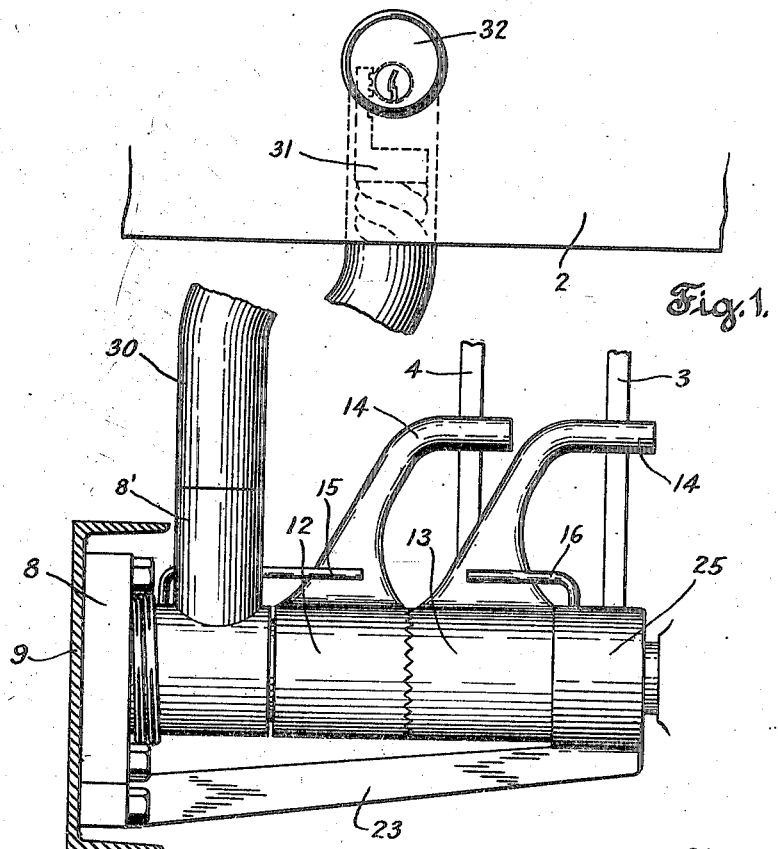
Fig. 1 is a partly broken away side view illustrating the device attached to a portion of the frame of an automobile, said frame being shown in section.

Referring to the drawings, 2 designates the instrument board of an automobile and 3 and 4 the usual clutch and foot brake levers, which are commonly fulcrumed in parallellism on a shaft 5 and each provided with a foot pedal 6 by means of which they may be rocked about the shaft to the position shown in dotted lines in Fig. 3 when it is desired to disconnect the engine from the transmission and bring the car to a stop.

Figure 2:
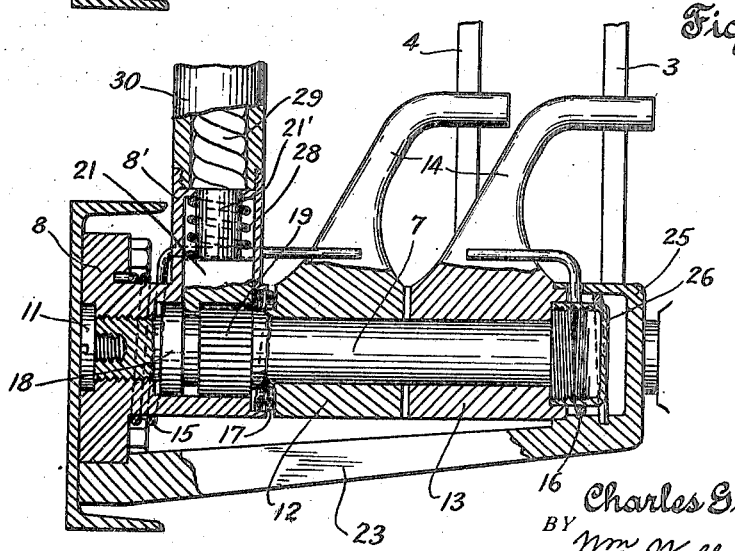
Fig. 2 is a central longitudinal section of the device.

The present invention is intended to provide an efficient means for locking the levers in the dotted line position shown in Fig. 3 thereby to render the clutch inoperative and retain the brake in its set position after the operator's foot has been removed from the pedal. To this end I have provided a shaft 7, which at its inner end is threaded into a housing block 8 that is secured to any suitable part of the frame of the car, as for instance the transverse channel bar 9, said housing being provided in its rear wall with a cylindrical recess for the reception of the head of a stud 11 which is threaded into the end of the shaft. Mounted for rotation on the shaft 7 are a pair of sleeves 12 and 13, each having a bent arm 14 extending therefrom, said arms being disposed so as to engage the upper side of the clutch and brake levers respectively and being normally maintained in contact with said levers by a pair of coiled springs 15 and 16. The sleeves 12 and 13 are provided on their contiguous end with interengaging teeth, as best shown in Fig. 1, whereby under ordinary conditions the two sleeves rotate together as one member. In order, however, to permit them to be rotated independently, a sufficient amount of axial play is provided for to permit disengagement of the teeth of the sleeves, a coiled spring 17 being provided which exerts tension in an axial direction on one of the sleeves and tends to normally retain the sleeves with their teeth in engagement. The sleeve 12 is provided with an axial extension divided by an annular recess or groove into two portions 18 and 19. The sleeve portion 19 has formed on its periphery a series of teeth adapted to mesh with the teeth 20 formed in the concave lower end of the locking member 21. This locking member is also provided with a depending flange 22 at one side of the teeth, the lower edge of the flange being concave so as to engage in the annular groove between the sleeve portions 18 and 19. It will thus be seen that with the teeth of the member 21 in engagement with those of the sleeve 19 and the flange 22 within the annular recess of said sleeve, as shown in Fig. 2, the sleeves 12 and 13 will be locked against rotation and also against axial displacement.

For supporting the outer end of the shaft 7 and sustaining the weight of the sleeves carried thereby a bracket 23 is secured by means of screws 24 to the frame of the car, said bracket extending beneath the shaft and provided at its outer end with a cylindrical portion 25 forming a housing for enclosing the end of the shaft and providing a bearing for the sleeve 13, a cap 26 being threaded on the end of the shaft and extending partly into the sleeve 13. The spring 16 for operating the arm of sleeve 13 is wound around the cap 26, one end of said spring being seated in a hole in the wall of the housing 25, while the other end of the spring passes through a slot 27 also formed in the wall of the housing and is then bent over into engagement with the arm of sleeve 13. The spring 15 for operating the arm of sleeve 12 is wound around a cylindrical portion of the housing member 8, one end of said spring being seated in a hole in the member while the opposite end is bent parallel with the shaft 7 so as to exert its tension on the arm of sleeve 12, as shown in Fig. 2.

For operating the locking member 21 said member is provided with a shank 21' which is encircled by a coiled spring 28, the housing member 8 having a tubular vertical extension 8' enclosing said shank and spring and provided with an internal flange forming an abutment for one end of the spring and serving to guide the shank 21' in its vertical movements, the opposite end of the spring abutting against the shouldered portion 21 of the locking member. The operation of the locking member is controlled by a flexible connecting member 29 which is secured at one end to the shank 21' of the locking member and passes through a tube 30 that is threaded into the housing 8', the opposite end of the connecting member being provided with a locking device 31 adapted to be operated by a lock 32. It will be obvious that the lock may be located at any desired or convenient point. For instance, in Fig. 1 the lock is shown located on the instrument board, while in Fig. 5 it is shown in the floor of the car directly over the locking member 21. In the latter case the tubing 30 and the long flexible connecting member are eliminated.

The operation of the device is as follows:

The arms of the sleeves 12 and 13 normally rest on the upper edges of the clutch and brake levers respectively, the springs 15 and 16 insuring that the arms will follow the movements of said levers when pressed downward, provided the locking members 19 and 21 are disengaged. It will thus be seen that if the levers are depressed so as to cause disengagement of the clutch and engagement of the brake, and the key is turned in the lock so as to cause the teeth 20 of the locking member 21 to engage the teeth of the sleeve 19, the clutch and brake levers will be held against returning to their normal positions upon removal of the feet of the operator. The car is thus positively locked against unauthorized removal, since it cannot be driven because of the disengagement of the clutch and it cannot be towed without burning out the brake linings.

During the ordinary running of the car the sleeves will be locked with their arms in uppermost position so that they cannot follow the depression of the clutch and brake levers. When it is desired to lock one lever and not the other, this may be accomplished by first withdrawing the locking member 21 from engagement with the teeth of sleeve 19, thus also withdrawing the flange 22 from the annular groove in said sleeve, whereupon the sleeve 12 may be slid axially against the tension of its spring 17 to cause disengagement of the teeth on the abutting ends of the sleeves 12 and 13. Either of the sleeves may then be rotated independently of the other to engage its lever in depressed position, and upon reengagement of the teeth of the sleeves, they may be locked in this new relation.

It will be obvious that in cases where the clutch and brake levers are not relatively located as illustrated herein the form and length of the arms of the sleeves 12 and 13 may be modified to meet the requirements of any particular case.

While I have described in detail the structure herein illustrated, it is to be understood that I do not thereby limit my invention to the precise features of construction shown, as I am aware that many mechanical changes and modifications may be made therein without departing from the spirit and scope of the invention as set forth in the claims appended hereto.

Having thus described my invention, what I claim is:

1. A locking device for motor-driven vehicles, comprising, in combination with the brake lever of the vehicle, means normally engaging said lever and automatically movable therewith when the lever is depressed, and means for locking said first means thereby to prevent the return of the lever from depressed position.

2. A locking device for motor-driven vehicles, comprising, in combination with the brake lever of the vehicle, means normally engaging said lever and automatically movable therewith when the lever is depressed, and means for locking said first means against movement with the lever.

3. A device for locking motor-driven vehicles, comprising, in combination with the brake lever of the vehicle, means normally engaging said lever and automatically movable therewith when the lever is depressed, and means for locking said first means against movement with the lever and also operative to lock said means to prevent the return of the lever from depressed position.

4. A locking device for motor-driven vehicles, comprising, in combination with the clutch and brake levers of the vehicle, means normally engaging said levers and automatically movable therewith when the levers are depressed, and means for locking said first means thereby to prevent return of the levers from depressed position.

5. A device for locking motor-driven vehicles, comprising, in combination with the clutch and brake levers of the vehicles, means normally engaging the brake lever and automatically movable therewith when the lever is depressed, independent means normally engaging the clutch lever and automatically movable therewith when said lever is depressed, cooperating means carried by said brake and clutch engaging means for locking said means against independent movement, and means for locking the clutch and brake engaging means thereby to prevent return of the clutch and brake levers from depressed position.

6. A device for locking motor-driven vehicles, comprising a pair of arms supported for independent rotation, one normally in engagement with the clutch lever of the vehicle and the other with the brake lever, said arms carrying cooperating means for preventing independent rotation, a locking member carried by one of said arms, and a cooperating locking member adapted to engage said first locking member thereby to retain the arms in engagement with their respective levers and prevent the return of said levers from depressed position.

7. A device for locking motor-driven vehicles, comprising, in combination with the clutch and brake levers of said vehicle, a pair of arms supported for independent rotation, one normally engaging the clutch lever and the other engaging the brake lever, means for automatically rotating said arms thereby to retain them in engagement with the respective levers when the latter are depressed, and locking means for retaining said arms in the depressed position of the levers, thereby to prevent said levers from returning from said position.

8. A locking device for motor-driven vehicles, comprising, in combination with the clutch and brake levers of the vehicle, a pair of arms supported for independent rotation, one normally engaging the clutch lever and the other the brake lever, cooperating means carried by said arms for preventing independent rotation, means for permitting disengagement of said cooperating means, a locking member carried by one of said arms, and a cooperating locking member adapted to engage said first locking member thereby to lock the arms in engagement with the levers in the depressed position, said locking members having cooperating means for preventing disengagement of one arm from the other.

In testimony whereof I have signed my name to this specification.

CHARLES GERBEN.